United States Patent [19]

Nakajima et al.

[11] Patent Number: 5,001,619
[45] Date of Patent: Mar. 19, 1991

[54] HARMONICS SUPPRESSION CONTROL CIRCUIT FOR A PWM INVERTER

[75] Inventors: Kihei Nakajima, Yokohama; Shinji Sato, Fuchu, both of Japan

[73] Assignee: Kabushiki Kaisha Toshiba, Kawasaki, Japan

[21] Appl. No.: 526,689

[22] Filed: May 22, 1990

Related U.S. Application Data

[63] Continuation-in-part of Ser. No. 280,428, Dec. 6, 1988, abandoned.

[30] Foreign Application Priority Data

Dec. 7, 1987 [JP] Japan .................. 62-307605

[51] Int. Cl.$^5$ .......................... H02M 7/44
[52] U.S. Cl. .......................... 363/41; 363/96
[58] Field of Search .......................... 363/41, 42, 96; 318/811

[56] References Cited

U.S. PATENT DOCUMENTS

| 4,742,441 | 5/1988 | Akerson | 363/97 |
| 4,758,938 | 7/1988 | Kanazawa | 318/811 |

FOREIGN PATENT DOCUMENTS

| 63176 | 10/1982 | European Pat. Off. | 363/41 |
| 83012 | 7/1983 | European Pat. Off. | 318/811 |
| 3241828 | 5/1984 | Fed. Rep. of Germany . | |
| 103877 | 6/1983 | Japan | 363/41 |
| 2107945 | 5/1983 | United Kingdom . | |
| 2120868 | 12/1983 | United Kingdom | 363/41 |

Primary Examiner—William H. Beha, Jr.
Attorney, Agent, or Firm—Foley & Lardner, Schwartz, Jeffery, Schwaab, Mack, Blumenthal & Evans

[57] ABSTRACT

In an apparatus for carrying out PWM control of an inverter having a filter connected to the a.c. output side thereof, pulse patterns adapted for determining switching timings for canceling a specified harmonic component, e.g., the fifth order harmonic component included in a voltage on the output side of the filter without exerting an influence on the output voltage fundamental wave, are stored in advance into a memory with respect to various vector quantities of the specified harmonic component to select, from a plurality of pulse patterns stored in the memory, each time a pulse pattern for reducing the specified harmonic component. The inverter is subjected to PWM control in accordance with the pulse pattern thus selected.

6 Claims, 7 Drawing Sheets

F I G. I

| V5yy\V5xx | -0.10 | | | | | -0.09 | | | | | -0.08 | | | | ... |
|---|---|---|---|---|---|---|---|---|---|---|---|---|---|---|---|
| -0.10 | -32.99 | -24.67 | -4.03 | 9.71 | 21.46 | -32.32 | -24.06 | -3.68 | 10.34 | 21.76 | -31.63 | -23.40 | -3.33 | 10.99 | 22.08 |
| -0.09 | -33.08 | -25.09 | -4.19 | 9.42 | 21.01 | -32.38 | -24.46 | -3.84 | 10.06 | 21.30 | -31.66 | -23.77 | -3.40 | 10.73 | 21.63 |
| -0.08 | -32.21 | -25.54 | -4.30 | 9.09 | 20.54 | -32.47 | -24.88 | -4.02 | 9.74 | 20.82 | -31.72 | -24.16 | -3.61 | 10.42 | 21.15 |
| -0.07 | -33.36 | -26.02 | -4.57 | 8.73 | 20.05 | -32.60 | -25.33 | -4.21 | 9.39 | 20.33 | -31.80 | -24.59 | -3.83 | 10.08 | 20.65 |
| -0.06 | -33.55 | -26.53 | -4.79 | 8.33 | 19.54 | -32.76 | -25.83 | -4.42 | 8.99 | 19.81 | -31.92 | -25.06 | -4.03 | 9.70 | 20.13 |
| -0.05 | -33.79 | -27.09 | -5.02 | 7.90 | 19.01 | -32.96 | -26.36 | -4.65 | 8.56 | 19.27 | -32.09 | -25.56 | -4.26 | 9.27 | 19.58 |
| -0.04 | -34.08 | -27.69 | -5.27 | 7.42 | 18.46 | -33.22 | -26.85 | -4.90 | 8.08 | 18.71 | -32.30 | -26.12 | -4.60 | 8.80 | 19.00 |
| -0.03 | -34.42 | -28.35 | -5.55 | 6.91 | 17.90 | -33.53 | -27.59 | -5.18 | 7.56 | 18.12 | -32.57 | -26.74 | -4.78 | 8.27 | 18.40 |
| -0.02 | -34.83 | -29.06 | -5.84 | 6.35 | 17.32 | -33.91 | -28.30 | -5.48 | 6.99 | 17.52 | -32.71 | -27.42 | -5.07 | 7.70 | 17.77 |
| -0.01 | -35.31 | -29.84 | -6.15 | 5.75 | 16.72 | -34.37 | -29.07 | -5.80 | 6.38 | 16.90 | -33.34 | -28.18 | -5.40 | 7.06 | 17.12 |
| 0.00 | -35.86 | -30.68 | -6.48 | 5.12 | 16.12 | -34.91 | -29.93 | -6.14 | 5.71 | 16.26 | -33.86 | -29.03 | -5.76 | 6.38 | 16.45 |
| 0.01 | -36.51 | -31.60 | -6.83 | 4.45 | 15.51 | -35.56 | -30.86 | -6.51 | 5.01 | 15.61 | -34.49 | -29.98 | -6.14 | 5.64 | 15.77 |
| ... | ... | ... | ... | ... | ... | ... | ... | ... | ... | ... | ... | ... | ... | ... | ... |

FIG. 7 PULSE PATTERN TABLE

HARMONICS SUPPRESSION CONTROL CIRCUIT FOR A PWM INVERTER

This application is a continuation-in-part of application Ser. No. 07/280,428, filed Dec. 6, 1988, now abandoned.

BACKGROUND OF THE INVENTION

1. Field of the Art

This invention relates to an apparatus for controlling a PWM inverter used as an uninterruptible power supply etc.

2. Prior Art

PWM inverters which output constant voltage and constant frequency a.c. voltage are generally used as an uninterruptible power supply used when a failure in the system occurs, or the like. Inverters of this kind input d.c. power to convert it to an a.c. voltage having a predetermined voltage and a predetermined frequency to output such an a.c. voltage. This output a.c. voltage is ordinarily delivered to the load through the interconnecting transformer and the filter. The filter is composed of an a.c. filter reactor and an a.c. filter capacitor. On the input side of the inverter, a d.c. power source capable of having its output voltage adjusted is ordinarily provided. An adjustment of the output voltage of the inverter is made through the voltage adjustment of the d.c. power source. In that case, the inverter shares the role of the frequency adjustment and is controlled by a fixed gate signal corresponding to a predetermined phase reference so that the output voltage becomes equal to a sinusoidal waveform as far as possible.

The filter on the output side of the inverter reduces harmonic components due to switching of power semiconductor elements constituting the inverter, and also serves to prevent overcurrent at the time of short-circuit failure on the side of the load.

For the power semiconductor elements used in the inverter, there are many instances where transistors are used in the small or medium capacity inverter, and gate turn-off thyristors (GTO) are used in the large capacity inverter over several hundred KVA. In the case of GTO used in the large capacity inverter, it is impossible to operate it at a switching frequency as high as that of the transistor. In the case of an output frequency of 50 or 60 Hz, there are many instances where the number of switchings per cycle is less than 10. The number of switchings is limited in view of the switching speed and the loss of the element itself. The harmonics in the inverter output voltage are reduced by the filter provided on the side of the a.c. output of the inverter. Thus, an a.c. voltage similar to the sinusoidal wave is obtained from the output side of the filter. The a.c. voltage thus obtained is delivered to the load.

When a d.c. load is connected through a rectifier on the output side of the filter, many harmonic components except for the fundamental sinusoidal wave are included in the a.c. output current of the inverter. Accordingly, harmonic components are also produced in the a.c. voltage depending on the magnitude of the load power. Such harmonic components can be reduced to some extent by the filter on the a.c. side, but voltage distortion may increase when the load power is large. Since the inverter cannot make such a corrective operation to reduce harmonics due to distorted power on the load side of the inverter in the case of carrying out operation when the number of pulses and the switching phase are fixed, when the load power becomes large, the voltage distortion will also become large. An overvoltage or undervoltage is momentarily produced on the side of the load, resulting in the possibility that equipment forming the load conducts an erroneous operation. In addition, in the case where another load or loads are connected differently from the rectifier load, an adverse influence or effect may be exerted on such load.

SUMMARY OF THE INVENTION

Accordingly, a principal object of this invention is to provide an apparatus for controlling an inverter, which is capable of reducing distortion in the filter output voltage waveform which may be produced depending upon the kind of load.

Another object of this invention is to provide an apparatus for controlling an inverter, which is capable of reducing a specified harmonic component or components of the filter output voltage.

To achieve the above objects, an apparatus for controlling an inverter according to this invention is a control apparatus for carrying out PWM control of an inverter having a filter connected on the a.c. output side thereof, which comprises voltage detector means for detecting an output voltage of the filter, harmonic component computation means for computing a specified harmonic component included in a voltage detected by the voltage detector means, memory means in which pulse patterns for determining the switching timings for cancelling said specified harmonic component without exerting an influence on an output voltage fundamental wave of the inverter are stored with respect to various vector quantities of the specified harmonic component, pattern selector means for selecting, from a plurality of patterns stored in the memory means, a pulse pattern for reducing the specified harmonic component computed by the harmonic component computation means, and gate pattern generator means for carrying out PWM control of the inverter in accordance with the pulse pattern selected by the pattern selector means.

BRIEF DESCRIPTION OF THE INVENTION

In the accompanying drawings:

FIG. 7 illustrates the pulse pattern memory stored in the computer of FIG. 6.

DESCRIPTION OF THE PREFERRED EMBODIMENTS

Figure 6:
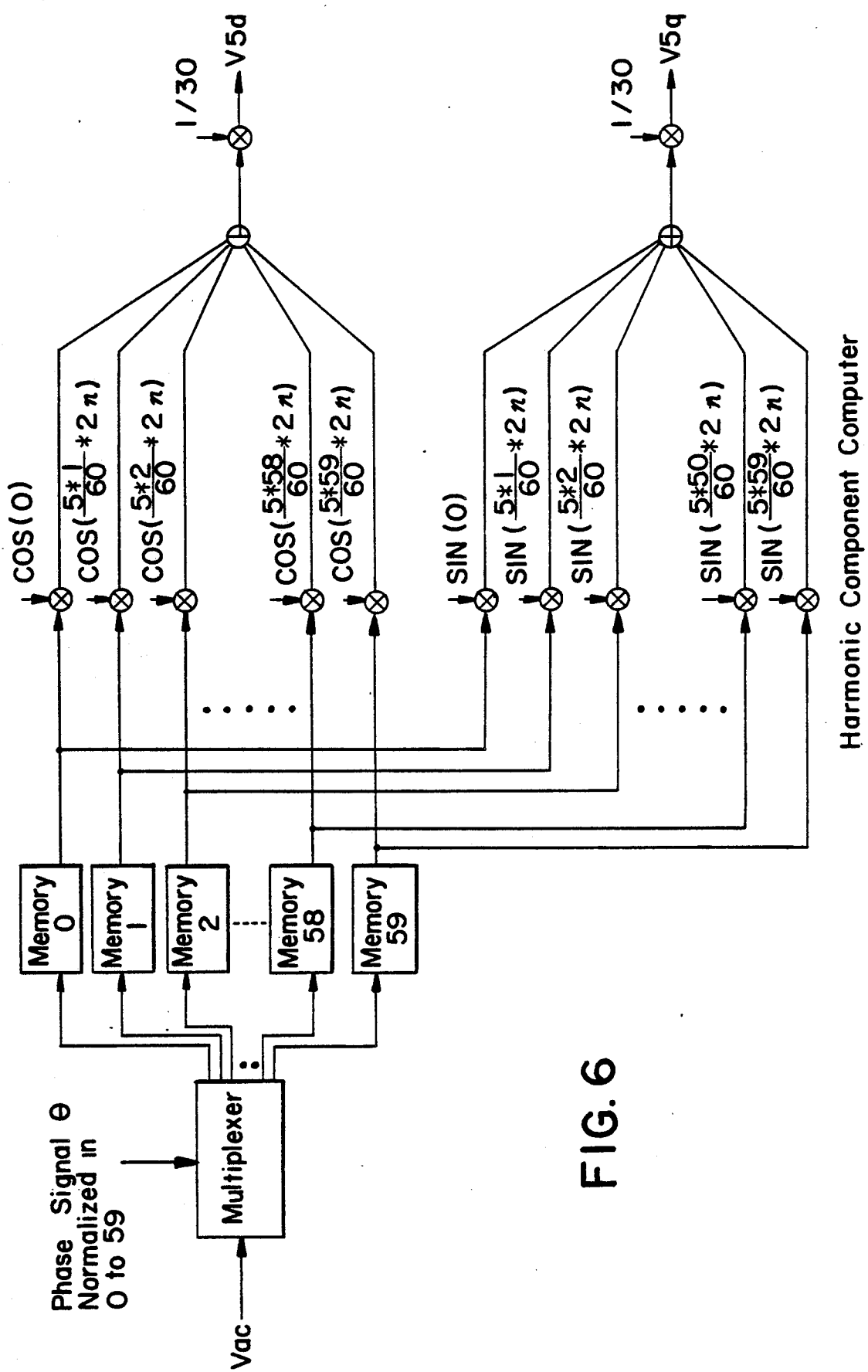
FIG. 6 illustrates a schematic diagram of a prior art harmonic component computer.

FIG. 6 shows a schematic diagram of a harmonic component computer known in the prior art. This computer is phase signal normalized. These harmonic components are calculated 60 times per cycle of the basic wave. In such a structure, calculations are simply carried out because it is sufficient to calculate only the changed parts after comparison with the results of calculations already carried out. The computer of this Figure could be, for example, a DSP (μPD7720) constructed as a general purpose DSP functioning with a specific program. The program causes the computer to carry out calculations according to equation 2 (lines 26 to 29 of the specification.

The DSP is made of a digital type IC, so an a.c. detection voltage signal $V_{acd}$ is first converted to a d.c. signal through an A/D converter and the d.c. signal is inputted to the DSP computer. The pulse pattern memory stores the pulse pattern table (FIG. 7). From this table, values $V_{5xx}$ and $V_{5yy}$ are calculated by harmonic component computer 17, enabling the phase signals 01 to 04 to be calculated.

This pulse pattern memory may be an external read only memory (ROM). The ROM may be, for instance, a model TMM27256 made by Toshiba Corp.

The table stored in the pulse pattern memory deals with values $V_{5xx}$ and $V_{5yy}$ as discontinuous quantities. Thus, after calculations on the basis of equation (4) by correction value computer rounding off is carried out. For example, if equation (4) indicates that $V_{5xx}$ and $V_{5yy}$ equal, respectively, 0.052 and 0.19, the rounding off produces 0.05 and 0.20. The values $V_{5xx}$ and $V_{5yy}$ are stored in the address $V_{5x}$ and $V_{5y}$ within the memory of correction value computer 18 as a "preceding value" and then the correcting treatment by means of equation (4) is repeated.

Figure 1:
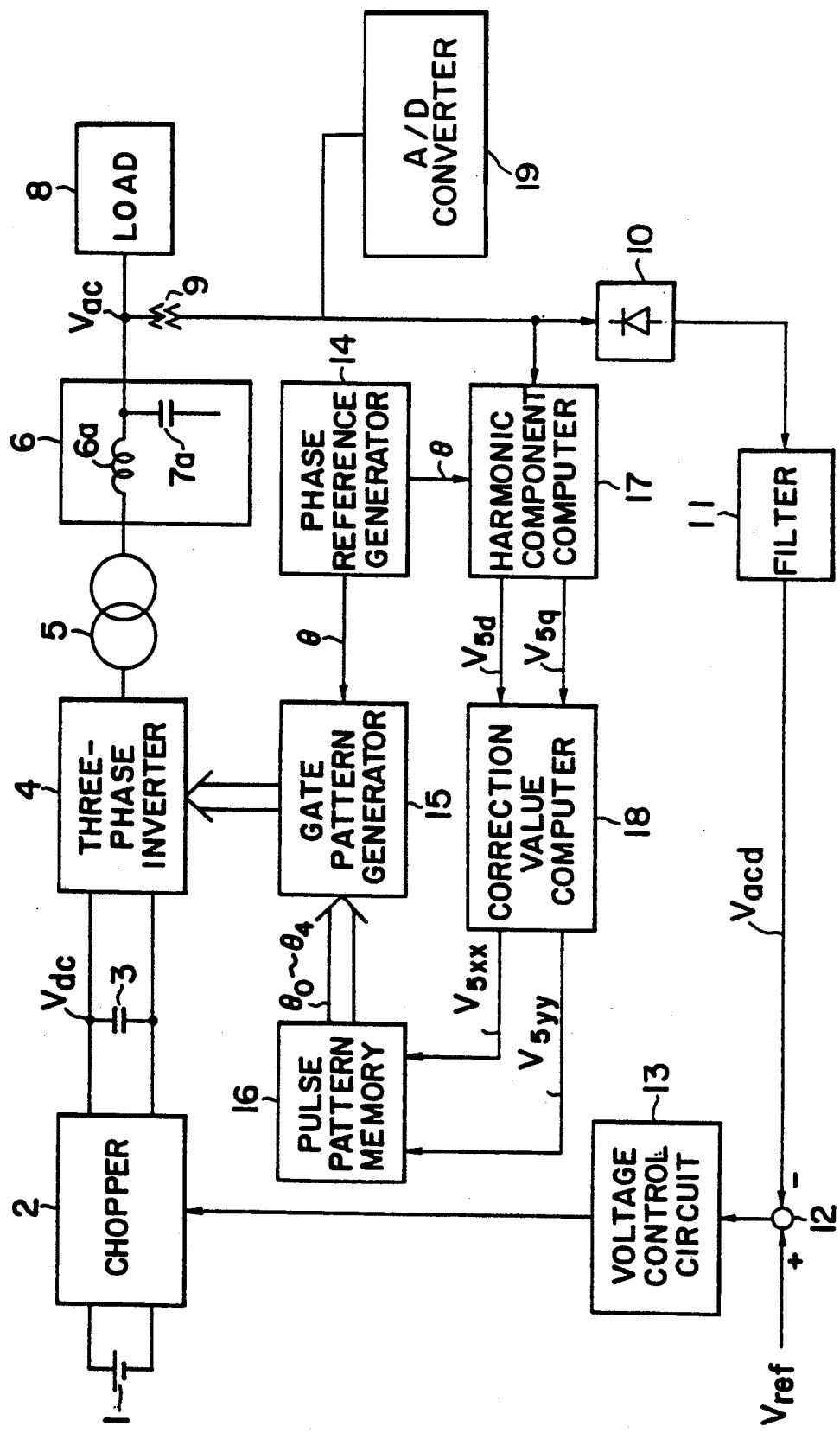
FIG. 1 is a block diagram showing an embodiment of an apparatus for controlling an inverter according to this invention.

In the main circuit of FIG. 1, the d.c. power delivered from a d.c. power source 1 is introduced to a three-phase PWM inverter 4 through a chopper 2 and a d.c. filter capacitor 3 and then converted to a.c. power by the inverter 4. The output a.c. power of the inverter 4 is delivered to a load 8 through an interconnecting three-phase transformer 5 and an a.c. filter 6. The a.c. filter 6 is composed of a filter reactor 6a and a filter capacitor 7a.

Figure 2:
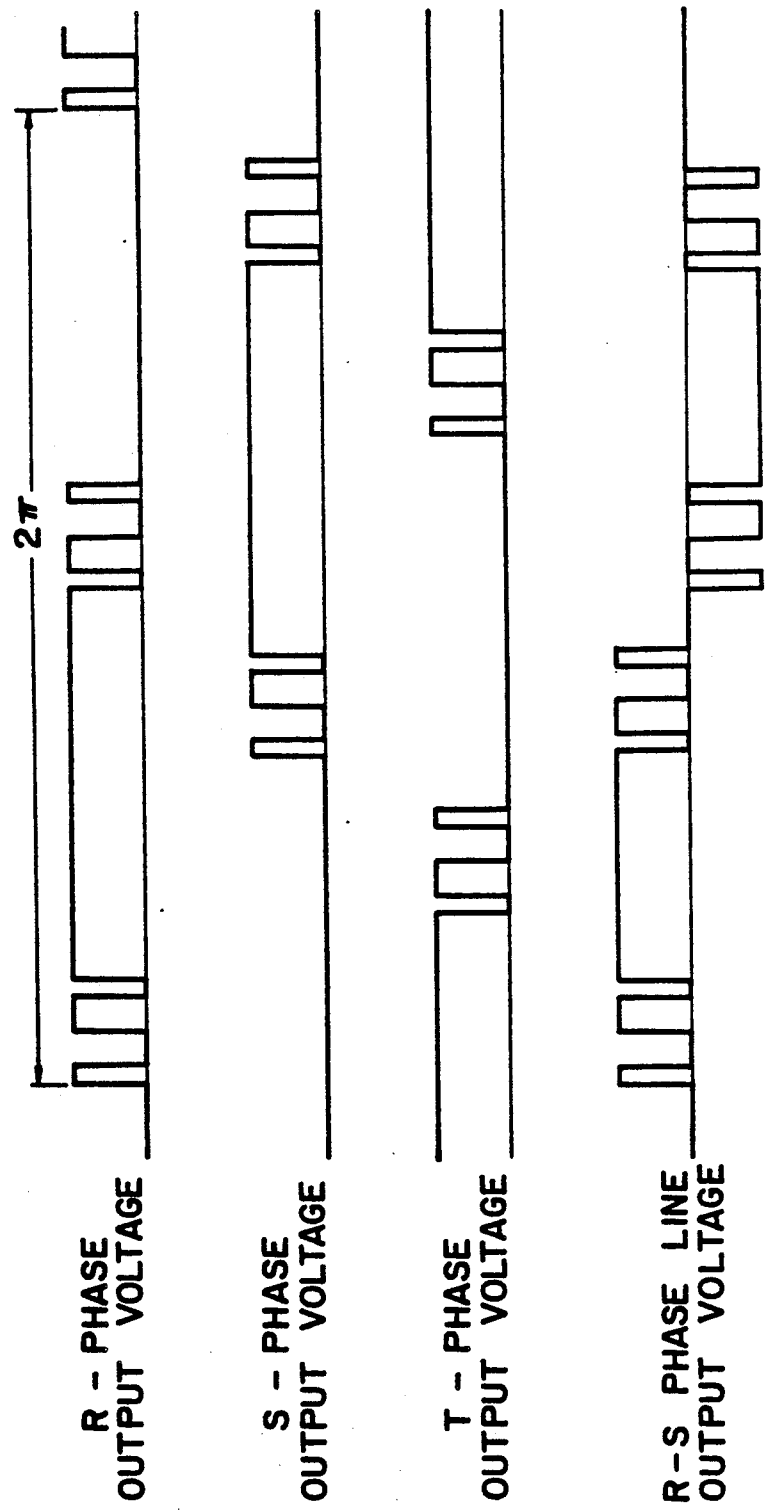
FIG. 2 shows a fundamental output voltage waveform of the inverter shown in FIG. 1.

In the case of carrying out, e.g., five switchings per cycle (=2π) for the switching mode of the inverter 4, the inverter R, S and T output voltages and the R-S phase line output voltage are as shown in FIG. 2. In the case of the line output voltage, five pulses are produced per half cycle. Harmonic components are reduced from such pulse-like voltage by the filter 6 on the a.c. side. As a result, an a.c. voltage similar to a sinusoidal wave is output from the filter 6.

In the section of the control apparatus, an output a.c. voltage $V_{ac}$ of the a.c. filter 6 is detected as an a.c. voltage detection signal $V_{acd}$ by a voltage transformer 9, a rectifier 10 and a filter 11 connected to the output si-e of the a.c. filter 6. A deviation between the a.c. voltage detection signal $V_{acd}$ thus obtained and an output voltage reference $V_{ref}$ is obtained by an adder 12. The chopper 2 is controlled through a voltage control circuit 13 so that the deviation becomes equal to zero. Thus, the output voltage of the chopper 2, i.e., the input voltage of the inverter 4 is controlled. In order to give a phase reference θ of the fundamental wave for firing of the inverter 4, a phase reference generator 14 is provided. For the purpose of computing harmonic components included in the output a.c. voltage $V_{ac}$ detected by the voltage transformer 9, e.g., a sine component $V_{5d}$ and cosine component $V_{5q}$ with the above-mentioned phase reference θ being a reference of the fifth order harmonic component $V_5$, a harmonic component computer 17 is provided Correction values $V_{5yy}$ and $V_{5xx}$ for canceling these sine and cosine components $V_{5d}$ and $V_{5q}$ by waveform control are computed by a Correction value computer 18. These computers 17 and 18 can be conventional central processing unit or conventional digital signal processors (DSP), preferably of the type sold on the open market. The CPU is, for instance, a model INTEL 8051, a product of Intel Corporation; the DSP is, for instance, a high speed model μPD7720, a product of Nippon Electric Corporation. A pulse pattern memory 16 stores therein, in the form of a Table, pulse patterns for canceling sine and cosine components of various vector quantities of the harmonic component without exerting an influence on the fundamental wave component. The pulse pattern memory 16 may be an external read only memory (ROM). The ROM is, for instance, a model TMM27256, a product of Toshiba Corporation. The pulse pattern memory 16 delivers to a gate pattern generator 15, PWM patterns $\theta_0$ to $\theta_4$ most suitable for canceling the sine and cosine components $V_{5d}$ and $V_{5q}$ with the correction values $V_{5yy}$ and $V_{5xx}$ from the correction value computer 18 that forms an index. The gate pattern generator 15 carries out on-off control of the inverter 4 with the phase reference θ from the phase reference generator 14 being as a reference in accordance with the PWM pattern phases $\theta_0$ to $\theta_4$. An A/D converter 19 is connected between voltage transformer 9 and component computer 17.

Figure 3:
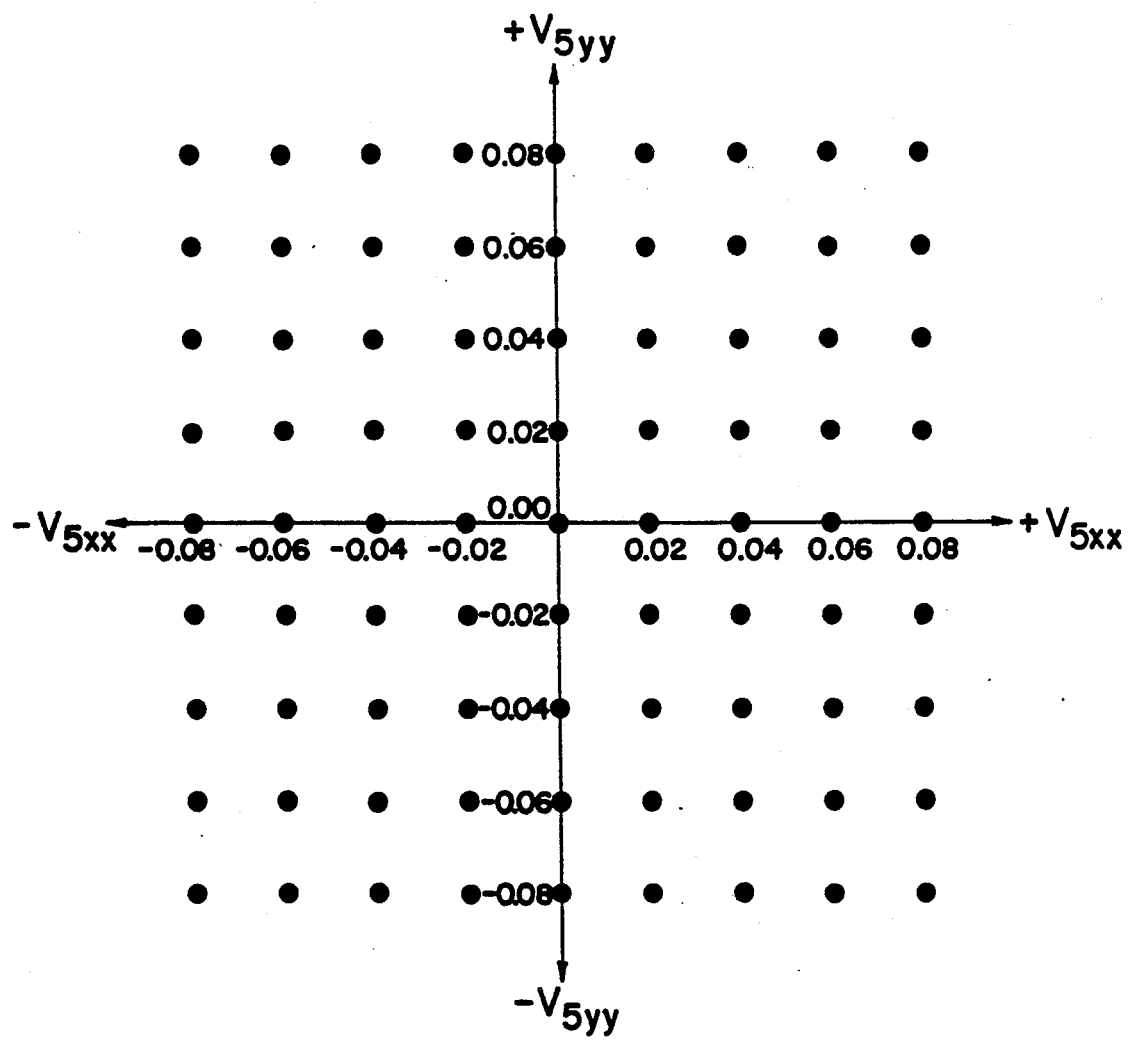
FIG. 3 is a diagram explaining the pulse pattern in the embodiment of this invention.

A pulse pattern table constructed as shown in FIG. 3 is stored in the pulse pattern memory 16. Information of phases $\theta_0$ to $\theta_4$ is stored on individual coordinate points in FIG. 3. These phases $\theta_0$ to $\theta_4$ can be calculated in accordance with the following equation:

$$\frac{2}{\pi} \{\cos\theta_0 - \cos\theta_1 + \cos\theta_2 - \cos\theta_3 + \cos\theta_4\} = V_1 \quad (1)$$

$$\frac{2}{\pi} \{\sin\theta_0 - \sin\theta_1 + \sin\theta_2 - \sin\theta_3 + \sin\theta_4\} = 0$$

$$\frac{2}{5\pi} \{\cos5\theta_0 - \cos5\theta_1 + \cos5\theta_2 - \cos5\theta_3 + \cos5\theta_4\} = V_{5xx}$$

$$\frac{2}{5\pi} \{\sin5\theta_0 - \sin5\theta_1 + \sin5\theta_2 - \sin5\theta_3 + \sin5\theta_4\} = V_{5yy}$$

where $V_1$ is the quantity proportional to the fundamental wave component.

Values obtained by the equation (1) are theoretical values. In practice, such a Table is prepared by taking into consideration the minimum switching width of an element determined by the rating value of the switching element of the inverter, and the like.

By having such information relating to phases as a Table, the inverter can output the fifth order harmonic component for correction suitable for canceling the fifth order harmonic component included in the filter output voltage within the range of the information existing in the Table.

The fifth order harmonic component of the a.c. voltage $V_{ac}$ output from the a.c. filter 6 is computed by the harmonic component computer 17. When it is assumed that the phase of the fundamental wave component of the output a.c. voltage $V_{ac}$ is θ, the instantaneous value of the output voltage is V, and the fundamental wave component of the output voltage is $V_1$, the fifth order harmonic component of the output a.c. voltage $V_{ac}$ can be calculated from an output voltage corresponding to one phase in accordance with the equation (2).

$$V_{5d} = \frac{1}{\pi \cdot V_1} \int_0^{2\pi} V \cdot \sin5\theta d\theta \qquad (2)$$

$$V_{5q} = \frac{1}{\pi \cdot V_1} \int_0^{2\pi} V \cdot \cos5\theta d\theta.$$

The information relating to the fundamental wave phase $\theta$ of the output a.c. voltage $V_{ac}$ is received from the phase reference generator 14. The computation expressed by the equation (2) shows the case where the fifth order harmonic component is represented by components having phases different from each other by 90 degrees. The correction value computer 18 computes correction values $\Delta V_{5x}$ and $\Delta V_{5y}$ allowing the output voltage to produce opposite components to the fifth order components $V_{5d}$ and $V_{5q}$ of the output voltage obtained from the harmonic component computer 17. These correction values $\Delta V_{5x}$ and $\Delta V_{5y}$ can be expressed using the equation (3) as follows:

$$\left. \begin{array}{l} \Delta V_{5x} = -\dfrac{V_{5d}}{1-(2\pi \cdot 5f)^2 \cdot L \cdot C} \\ \Delta V_{5y} = -\dfrac{V_{5q}}{1-(2\pi \cdot 5f)^2 \cdot L \cdot C} \end{array} \right\} \qquad (3)$$

In the equation (3), f is an output frequency (Hz), L is an inductance (H) of the a.c. filter 6, and C is a capacitance (F) of the a.c. filter 6. The correction value computer 18 has the function such that it calculates $\Delta V_{5x}$, $\Delta V_{5y}$ by equation (3) from $V_{5d}$, $V_{5q}$ and reserves the former $V_{5xx}$, $V_{5yy}$ as $V_{5x}$, $V_{5y}$ and then calculates and outputs $V_{5xx}$, $V_{5yy}$ by the equation (4) on the basis of the calculated $\Delta V_{5x}$ and the reserved $V_{5x}$, $V_{5y}$.

From these correction values $\Delta V_{5x}$ and $V_{5y}$, and the preceding correction values $V_{5x}$ and $V_{5y}$, new correction values $V_{5xx}$ and $V_{5yy}$ for eliminating the fifth order harmonic component of the output voltage waveform are computed as follows:

$$\begin{array}{l} V_{5xx} = V_{5x} + \Delta V_{5x} \\ V_{5yy} = V_{5y} + \Delta V_{5y}. \end{array} \qquad (4)$$

Figure 4:
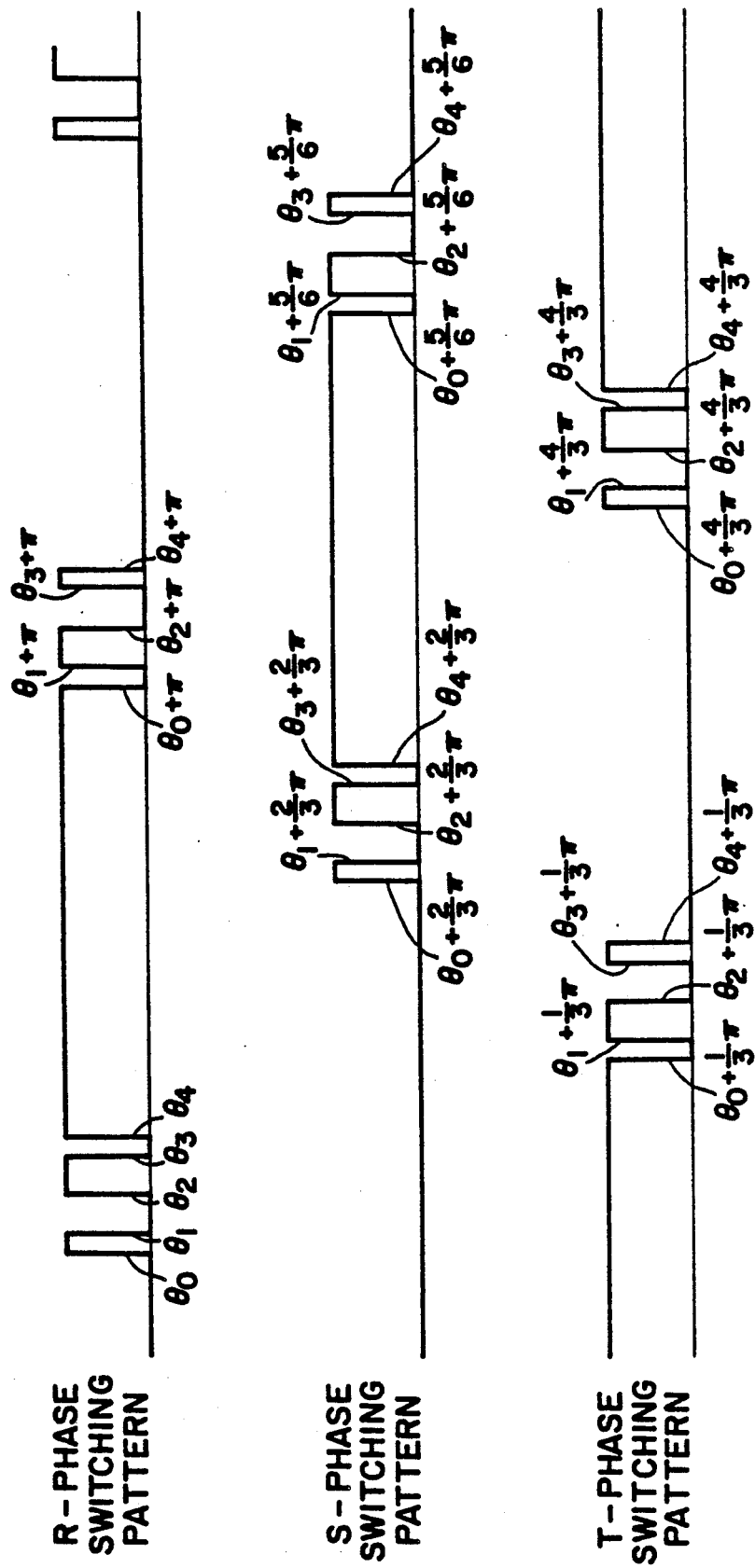
FIG. 4 is a diagram explaining switching patterns of respective elements of the inverter.

Because information storage points are arranged at intervals, only discrete values can be taken as the fifth order harmonic component which can be output from the inverter 4. Accordingly table coordinates closest to the values $V_{5xx}$ and $V_{5yy}$ are assumed as new values $V_{5xx}$ and $V_{5y}$, respectively. From the new correction values $V_{5x}$ and $V_{5y}$ obtained here, switching phase angles $\theta_1$ to $\theta_4$ corresponding thereto are obtained from the phase Table. The switching phase angles thus obtained are delivered to the inverter 4. Thus, the inverter 4 operates in accordance with the switching patterns as shown in FIG. 4 on the basis of the phase angles.

In the case of a load in which a current that does not have a sinusoidal waveform flows, such as, for example, a rectifier load, harmonic distortion is produced in the output voltage due to the harmonic current flowing in the load. Harmonics of a multiple of 3 among those harmonics and harmonics of other phases cancel each other out in the case of the three-phase output inverter, so that such harmonics of a multiple of 3 hardly appear on the line voltage. In addition, harmonic components of higher frequencies are filtered by the a.c. filter. Accordingly, for harmonics appearing on the output voltage, the fifth order component thereof is the largest. By reducing such a harmonic component, the overall voltage distortion factor of the output voltage can be considerably decreased.

In the above-described embodiment, the inverter 4 is controlled so that the fifth harmonic component included at the highest frequency in the output voltage is reduced, thus making it possible to provide an apparatus having an overall distortion factor smaller than that with the conventional inverter even in the case of a load producing many harmonics, such as, for example, a rectifier load.

Another embodiment will be now described.

In the preceding embodiment, attention was paid to the fifth order harmonic of the output voltage as a specified harmonic. In an inverter having a greater number of pulses, it is also possible to reduce harmonics of multiple orders at the same time in accordance with this invention. For example, in the case of reducing the fifth and seventh order harmonics, it is sufficient to compute the magnitudes and the phases of respective harmonics to move the pulse pattern in a direction to reduce those magnitudes. The seventh order harmonic component can be calculated by the following computational equation proportionately with the case of the above equation (2) relating to the fifth harmonic component:

$$V_{7d} = \frac{1}{\pi \cdot V_1} \int_0^{2\pi} V \cdot \sin7\theta d\theta \qquad (5)$$

$$V_{7q} = \frac{1}{\pi \cdot V_1} \int_0^{2\pi} V \cdot \cos7\theta d\theta.$$

Figure 5:
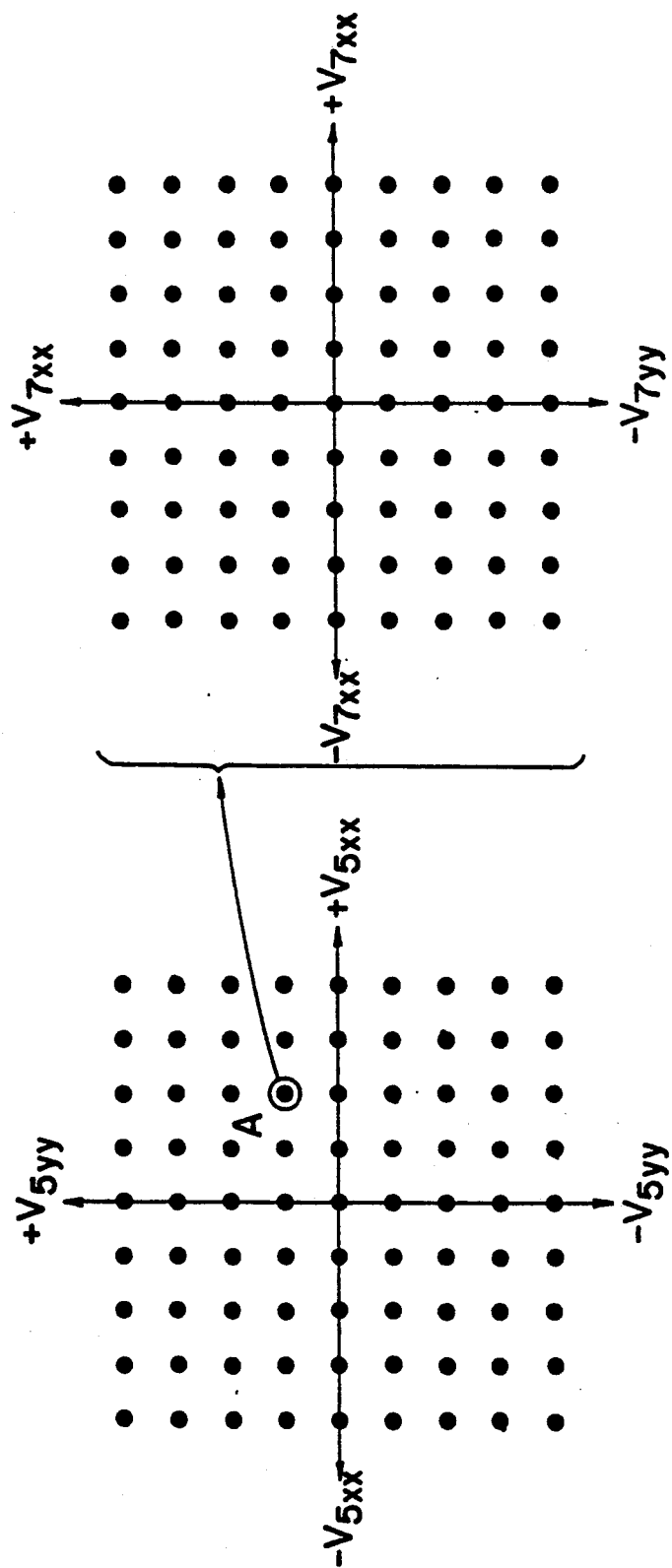
FIG. 5 is a diagram explaining a pulse pattern in another embodiment of this invention.

The fifth order harmonic component is calculated from equation (2) and the seventh order harmonic component is calculated from equation (5). Thus, such a pulse pattern to apply a correction voltage for canceling these harmonic components to the output voltage is given. For example, when it is assumed that the pattern position for reducing the fifth order harmonic component is the point A of FIG. 5, the seventh order harmonic component has a two-dimensional arrangement with the point A as a center. As a whole, a four-dimensional pattern Table is provided. Because of high computation speed and large capacity of the memory in processors for computation recently available, complicated computation and/or storage of a large quantity of data have become easier. Accordingly, control in consideration of multiple harmonic orders as in the embodiment just mentioned above can be realized relatively easily. In accordance with this embodiment, an output voltage having a lesser number of harmonics of the fifth and seventh orders is obtained on the output side of the a.c. filter 6. Thus, this embodiment makes it possible to deliver an a.c. power of high quality having a distortion smaller than that in the first-mentioned embodiment.

While it has been described that the inverter outputs an a.c. voltage of constant voltage and constant frequency, an inverter operative to output an a.c. voltage of variable voltage and variable frequency may also obtain advantages similar to those mentioned above.

As described above, this invention is directed to a control apparatus for an inverter equipment having a lesser number of pulses, wherein the control apparatus is constructed to detect an a.c. output voltage to compute a specified frequency component thereof to select a pulse pattern so that the specified frequency component is reduced to control the inverter, thereby making it possible to deliver to the load an a.c. power of high quality having an output voltage distortion smaller than that of conventional inverter equipment.

What is claimed is:

1. A control apparatus for carrying out PWM control of an inverter, said control apparatus for PWM inverter comprising:

a filter connected to the a.c. output of the inverter;

voltage detector means for detecting the output voltage of said filter;

harmonic component computation means for computing a specified harmonic component included in the voltage detected by said voltage detector means;

memory means in which pulse patterns adapted to determine switching timings for canceling said specified harmonic component without exerting an influence on an output voltage fundamental wave are stored with respect to various vector quantities of said specified harmonic component;

pattern selector means for selecting, from a plurality of patterns stored in said memory means, a pulse pattern for reducing a specified harmonic component computed by said harmonic component computation means; and gate pattern generator means for carrying out PWM control of said inverter in accordance with said pulse pattern selected by said pattern selector means.

2. A control apparatus as set forth in claim 1, which further comprises phase reference generator means for delivering a reference phase to said harmonic component computation means and to said gate pattern generator means.

3. A control apparatus as set forth in claim 1, wherein said harmonic component computation means is operative to computer the fifth order harmonic component included in said voltage detected by said voltage detector means, and said pattern selector means is operative to select a pulse pattern such that the quantity of said fifth order harmonic component becomes small.

4. A control apparatus for carrying out PWM control of an inverter, said control apparatus for the PWM inverter comprising:

a filter connected to the a.c. output of the inverter;

voltage detector means for detecting an output voltage of said filter;

harmonic component computation means for computing a specified first and second harmonic components included in the voltage detected by said voltage detector means;

memory means in which first pulse patterns adapted to determine switching timings for canceling said specified first harmonic component without exerting an influence on an output fundamental wave of said inverter, are stored with respect to various vector quantities of said specified first harmonic component, and second pulse patterns adapted to determine switching timings for canceling said specified second harmonic component without exerting an influence on said output fundamental wave, are stored with respect to various vector quantities of said specified second harmonic component;

pattern selector means for selecting from said pulse patterns stored in said memory means, a pulse pattern for reducing both specified first and second harmonic components computed by said harmonic component computation means; and gate pattern generator means for carrying out PWM control of said inverter in accordance with said pulse pattern selected by said pattern selector means.

5. A control apparatus as set forth in claim 4, which further comprises phase reference generator means for delivering a reference phase to said harmonic component computation means and to said gate pattern generator means.

6. A control apparatus as set forth in claim 4, wherein said harmonic component computation means is operative to compute harmonic components of the fifth and seventh orders included in said voltage detected by said voltage detector means, and said pattern selector means is operative to select a pulse pattern such that the quantities of said fifth and seventh order harmonic components become small.

* * * * *